United States Patent
Koduri et al.

(10) Patent No.: US 11,042,706 B2
(45) Date of Patent: Jun. 22, 2021

(54) NATURAL LANGUAGE SKILL GENERATION FOR DIGITAL ASSISTANTS

(71) Applicant: SAP SE, Walldorf (DE)

(72) Inventors: Naga Sai Narasimha Guru Charan Koduri, Vijayawada (IN); Rahul Choudhary, Bangalore (IN)

(73) Assignee: SAP SE, Walldorf (DE)

( * ) Notice: Subject to any disclaimer, the term of this patent is extended or adjusted under 35 U.S.C. 154(b) by 171 days.

(21) Appl. No.: 16/416,478

(22) Filed: May 20, 2019

(65) Prior Publication Data

US 2020/0372108 A1 Nov. 26, 2020

(51) Int. Cl.
*G06F 40/295* (2020.01)
*G06N 20/00* (2019.01)
*G06F 40/30* (2020.01)

(52) U.S. Cl.
CPC ............ *G06F 40/295* (2020.01); *G06F 40/30* (2020.01); *G06N 20/00* (2019.01)

(58) Field of Classification Search
CPC ..... G06N 20/00; G06F 40/216; G06F 40/295; G06F 40/30
See application file for complete search history.

(56) References Cited

U.S. PATENT DOCUMENTS

| | | | |
|---|---|---|---|
| 2011/0320307 A1* | 12/2011 | Mehta | G06Q 30/0641 705/26.7 |
| 2015/0121216 A1* | 4/2015 | Brown | G06N 3/008 715/707 |
| 2015/0347437 A1* | 12/2015 | Marti | G06Q 30/0282 707/731 |
| 2017/0193390 A1* | 7/2017 | Weston | G06N 3/08 |
| 2020/0218740 A1* | 7/2020 | Kraus | G06F 16/683 |

* cited by examiner

*Primary Examiner* — Angela A Armstrong
(74) *Attorney, Agent, or Firm* — Sterne, Kessler Goldstein & Fox P.L.L.C.

(57) ABSTRACT

Disclosed herein are system, method, and computer program product embodiments for developing natural language skills automatically. In order to generate a skill, metadata is read from a connected service, wherein the metadata specifies entities provided by the service. A relevant entity of the entities provided by the service is determined, and a likely request on the entity is generated.

20 Claims, 5 Drawing Sheets

NATURAL LANGUAGE SKILL GENERATION FOR DIGITAL ASSISTANTS

BACKGROUND

Digital assistants are typically artificial intelligence driven voice or text interfaces that make interactions with a system more natural to humans. Digital assistants are employed in a number of environments to simplify how users interact with systems. In their personal lives, users often interact with digital assistants on their phones to quickly check on the weather, sports scores, or other information that might otherwise require navigation through several menus and applications. For business applications, enterprise developers want to allow their users the same ease of access to their resources.

In order to intelligently respond to user requests, these digital assistants must be assigned and programmed with "skills." These skills inform behaviors of a digital assistant in responding to a particular type of request. Continuing the above example, one skill may allow the digital assistant to respond to inquiries about the weather, while another skill may allow the digital assistant to respond to inquiries about sport scores.

Developing and rolling out new digital assistant skills is a time consuming process. Approaches that simplify the creation of skills that respond to natural language requests are in demand by enterprise developers, and will greatly expand access to business application resources.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for automating a skill building process for a digital assistant.

Digital assistants are becoming ubiquitous as a way for users of a system to request information from large data sets and across multiple applications. Digital assistants allow users of the system to type in or speak requests for information using natural language requests. For example, a user may write (or speak) a natural language request such as, "show me products from supplier Talpa," indicating that the user wants to receive a list of all of the products held in a database where a 'supplier' field matches the value 'Talpa.'

In order to be able to respond to such a request, a developer would build a skill to handle the request. Specifically, the developer would need to first determine an 'intent' (intention)—an action that is being requested—such as, by way of non-limiting example, 'create' (to add a record), 'update' (to update a record), 'read' (to read a particular record), or 'query' (to identify records that match a property) and their synonyms. In this example, the request is a 'query' intent on a set of products ("show me products . . . "). One skilled in the relevant arts will readily recognize that various natural language processing techniques may be used to determine an intent, which are usable here.

The intent of a request is performed on what is termed an "entity." In the case of the foregoing example, we can term the entity "Product." The Product entity provides access to the records of interest. In this case, the Product entity can be queried in order to return records that match a certain property (in this case, where the 'supplier' property is 'talpa').

While this approach is rather straightforward in this example, the reality is that many entities are exposed and available for action in a production system. In order to operate effectively, a digital assistant should possess a variety of skills. In an enterprise environment, there are many different queries and actions that an end user may be expected to perform on these many and wide-ranging entities. Developing a skill requires a developer to manually sift through these entities to select the appropriate one that can be used to address the request. Building a single skill manually is a time-consuming process; building a large number of skills becomes a heavy investment.

Figure 1:
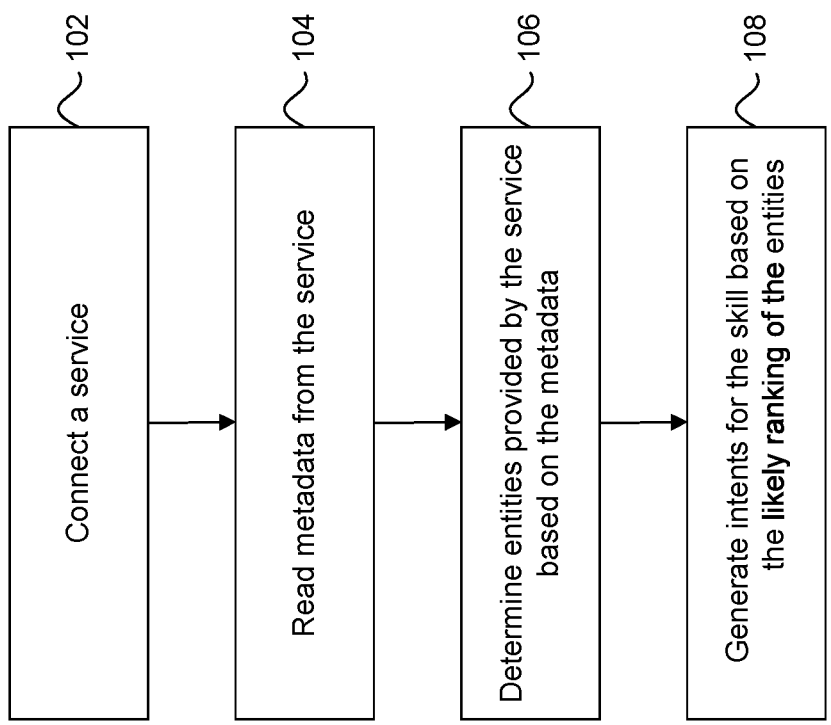
FIG. 1 is a flowchart illustrating steps for natural language processing skill generation, in accordance with an embodiment.

FIG. 1 is a flowchart 100 illustrating steps for natural language processing skill generation, in accordance with an embodiment. The skill being generated relies on information provided by a service (e.g., a web service). At step 102, a connection is made to the service by a skill builder component. In accordance with a non-limiting embodiment, the service is an Open Data Protocol (OData) service, but one skilled in the relevant art will appreciate that any service providing sufficient metadata for understanding entities provided by the service and connections between those entities can be used instead.

At step 104, metadata is read from the service. In the case of OData services, every service exposes metadata, although one skilled in the relevant arts would appreciate that other services may be used that expose such metadata. This metadata includes information regarding properties, entities, and their relationships. At step 106, entities provided by the service are determined based on this metadata.

And at step 108, the skill builder component generates intents for a skill based on a likely ranking on the entities. This process can be resolved in several different ways, described further herein.

When the metadata of any service is accessed, typically there will be many entities available, each with many properties. In order to create a natural language skill to access this service, the relevant entities should be identified on which to create intents.

Figure 2:
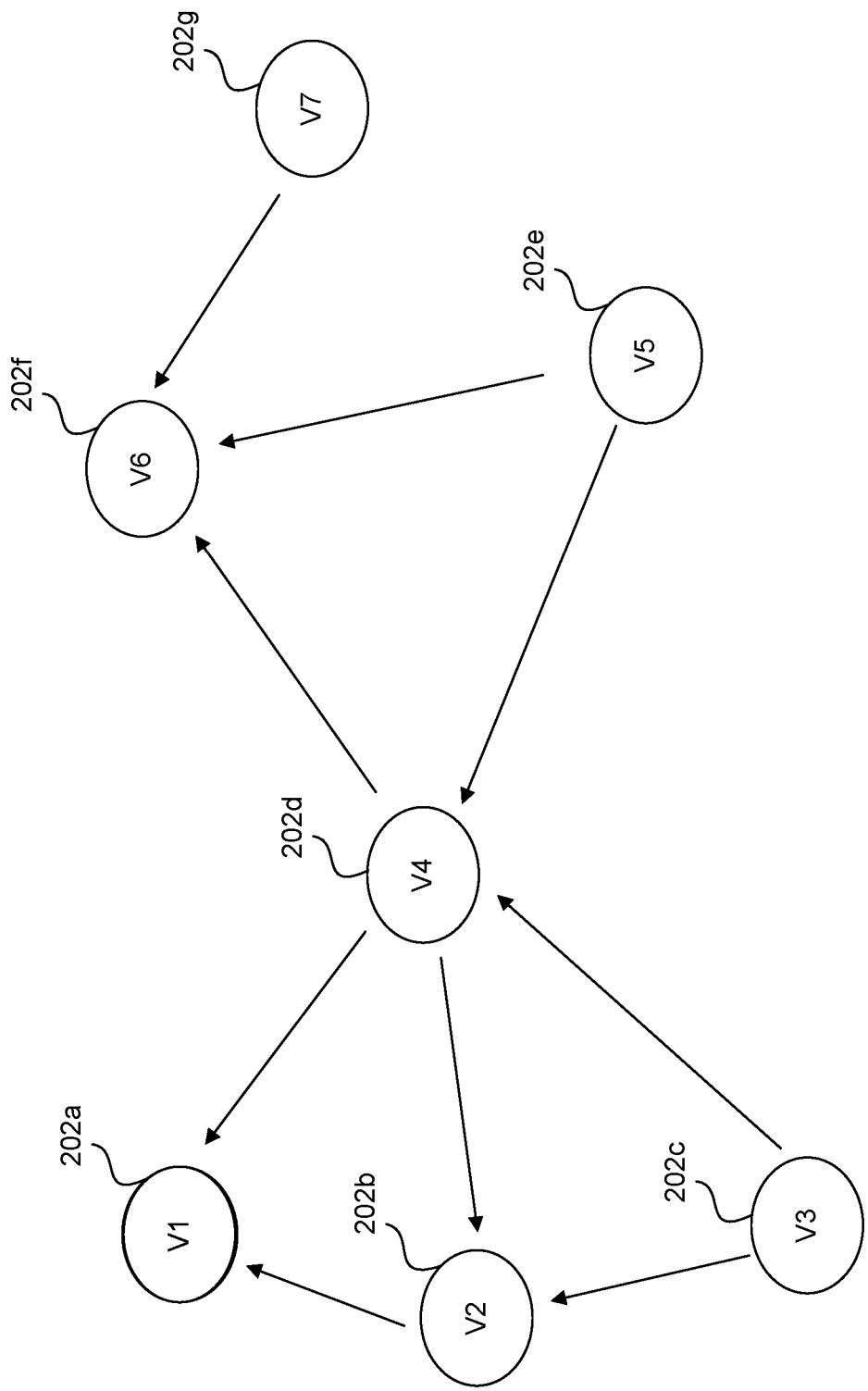
FIG. 2 is a graph showing entities as vertices and relationships between the entities as edges, in accordance with an embodiment.

Relevant entities can be identified using entity ranking. FIG. 2 is a graph 200 showing entities as vertices and relationships between the entities as edges, in accordance with an embodiment. For example, the entity at vertex V4 202*d* references the entities at vertices V1 202*a*, V2 202*b*, and V6 202*f*, and is referenced by the entities at V3 202*c* and V5 202*e*. Based on these relationships, a transaction that could be performed at the entity of V6 202*f* could also be performed through the entity of V4 202*d*, by in turn referencing V6 202*f*. But the entity of V4 202*d* could also resolve transactions at V1 202*a*, V2 202*b*, V3 202*c*, and V5 202*e* because of the relationships between V4 202*d* and those entities.

In short, the underlying assumption is that the more relationships an entity has, the more dependencies that can be resolved across the entire graph and therefore a greater number of transactions can be performed on that entity.

Using the exemplary set of nodes V={V1, V2, V3, V4, V5, V6, V7} of FIG. 2, these would be ranked from greatest number of relationships to least, where each edge is a relationship, as output={V4, V6, V2, V3, V5, V1, V7}, in accordance with an embodiment. Accordingly, intents would be created on the entity at vertex V4 202*d*.

One skilled in the relevant arts will appreciate that other approaches for ranking entities based on these relationships can be used. For example, the ranking may consider quality of a relationship between two entities (such as based on a type of relationship between two entities), participation constraints, and the availability of specific annotations (e.g., a "HeaderInfo" annotation) in the metadata. Additionally, entities in a parameterized entity set may be treated as the main entity over a result entity set.

Relevant entities can also be identified using entity classification, instead of or in conjunction with entity ranking. In an embodiment, for a given entity having a set of features describing the entity, a machine learning model can be used to determine whether intents should be created on that entity or not. This approach allows for more refined solutions than simply creating intents on entities that have a large number of relationships.

In the machine learning context, this problem is a classification problem. Each entity being considered is classified as either one for which intents should be created, or one for which intents should not be created, based on the features describing the entity.

For the purposes of discussion, the process of classifying the entities is handled by a classifier module, in accordance with an embodiment, although one skilled in the relevant arts will appreciate that such process may be integrated into other components of a digital assistant, or separated further into additional components. For brevity, this classifier module, however structured, will be referred to as a classifier.

The machine learning model can be trained using algorithms readily understood by one skilled in the relevant arts, such as logic regression, support vector machine (SVM), or random forests. If the dataset is highly non-linear, for example, deep neural networks can be used. The data sets used for training and test can be split into positive and negative samples, where an entity on which intents are created can be treated as a positive sample, and an entity on which intents are not created can be treated as a negative sample.

As previously noted, these approaches for identifying relevant entities can be used separately or together, depending on the data sets and the needed results. Machine learning algorithms can identify underlying hidden patterns in the entities, but require large pre-labeled data sets and periodic retraining. Entity ranking may miss some of these patterns, but do not require training and can be shipped ready to go with the digital assistant.

Another way to use the entity ranking and entity classification approaches together is to use entity ranking as a data generator for the classifier. Specifically, entities that rank highly in the entity ranking algorithm can be treated as positive samples, and entities that rank low as negative samples. A machine learning model of the classifier can be trained on the resulting data set. This approach works well if there is no annotated data for training a model, but enough system resources to deploy computationally-intensive machine learning algorithms.

Figure 3:
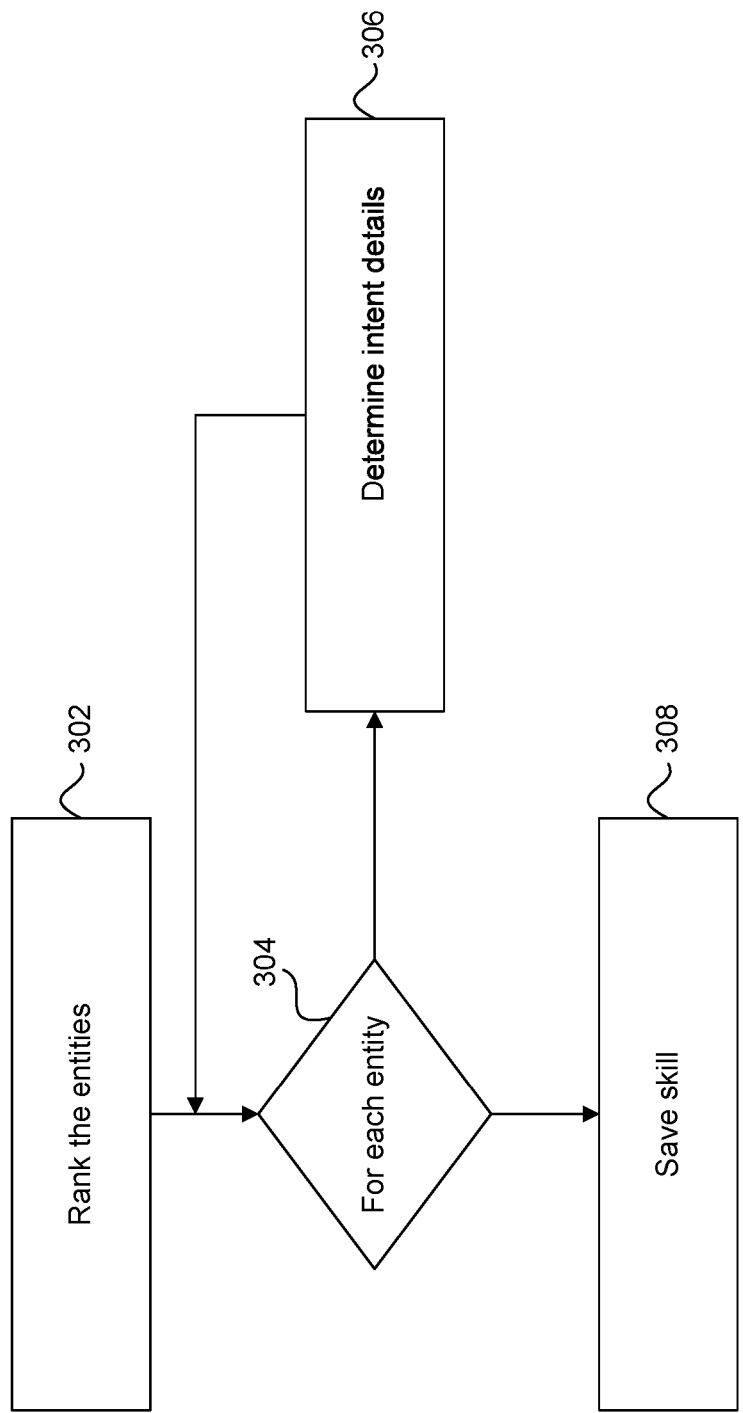
FIG. 3 is a flowchart illustrating steps by which a skill is created, in accordance with an embodiment.

FIG. 3 is a flowchart 300 illustrating steps by which a skill is created, in accordance with an embodiment. At step 302, the entities obtained from a service's metadata may be ranked according to an entity ranker, as described above in accordance with an embodiment. At step 304, each of these entities is considered (or some subset thereof, based on the ranking), and intent details are determined at step 306. The skill is saved at step 308.

Figure 4:
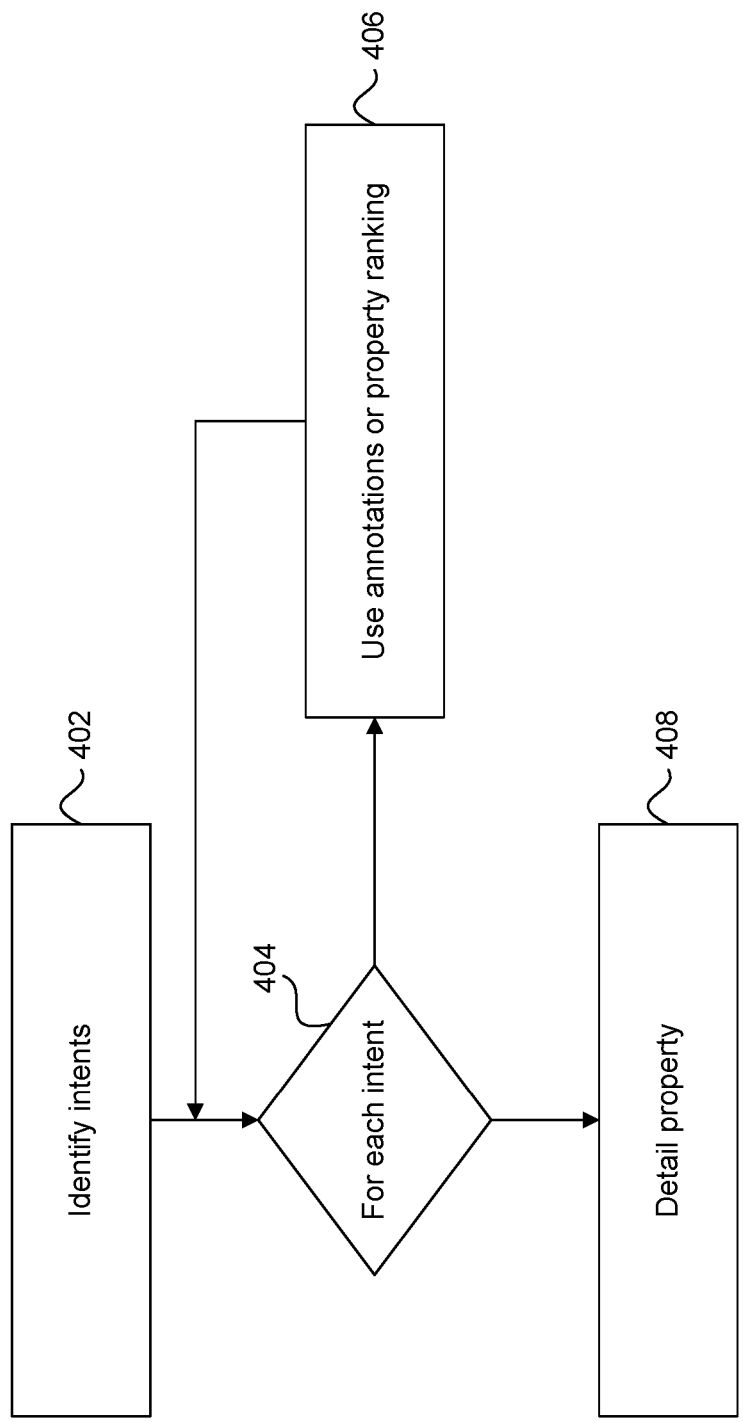
FIG. 4 is a flowchart illustrating steps by which intents on an entity are detailed, in accordance with an embodiment.

FIG. 4 is a flowchart 400 illustrating steps by which intents on an entity are detailed, in accordance with an embodiment. For a given entity, identified as described above, intents are identified at step 402.

At step 404, each of these intents is considered. For each intent, the type of action it performs is considered. Identification of these actions is performed using annotations that indicate whether the action is equivalent to a 'create' (to add a record), 'update' (to update a record), 'read' (to read a particular record), or 'query' (to identify records that match a property) action. By way of non-limiting example, these annotations may specifically identify the action as "creatable," "filterable," or "updateable."

At step 408, properties are added to each intent. Specifically, relevant properties that need to be supplied as part of the request should be identified. By way of non-limiting example, this is accomplished through the further use of annotations. These annotations identify, in human-readable form, which properties may be acted upon by the various actions (intents).

In case of missing annotations, properties could be ranked by either considering properties that are used to identify an object (primary keys) or properties that serve as linking properties to other objects (foreign keys). In another embodiment, machine learning can be used to identify relevant properties.

In the end, having identified the relevant entities, intents, and properties, this approach allows for the automatic building of skills based on those elements.

Figure 5:
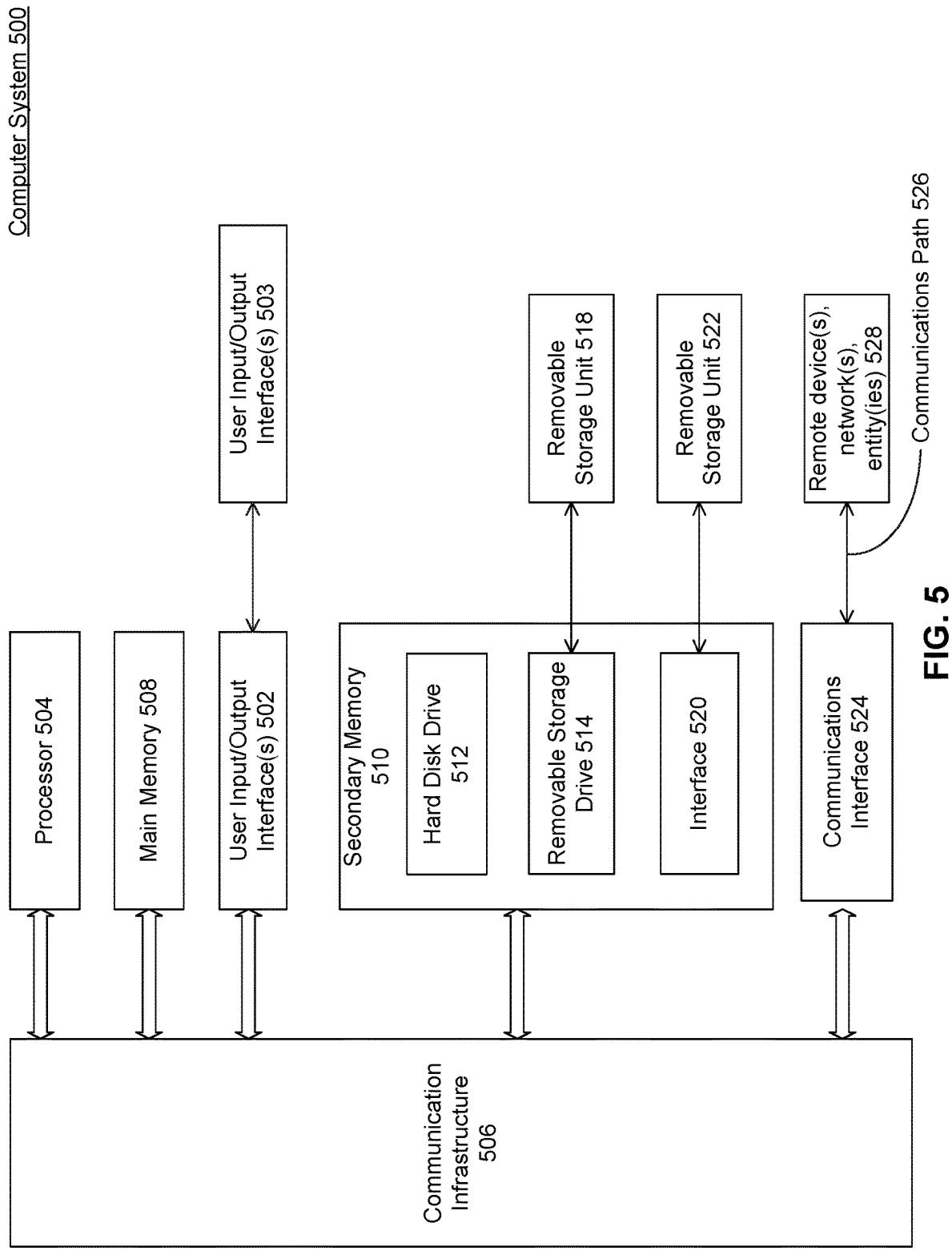
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
    reading, by one or more computing devices, second metadata from a second connected service, wherein the second metadata specifies second entities provided by the second connected service, properties of the second entities provided by the second services, and relationships between the second entities provided by the second service;
    classifying, by the one or more computing devices, an entity of the second entities provided by the second service as a classified relevant entity using an entity classifier machine learning model trained by a process comprising:
        reading first metadata from a first connected service, wherein the first metadata specifies first entities provided by the first connected service and relationships between the first entities provided by the first connected service,
        ranking the first entities provided by the first connected service based on a quantity of the relationships between each of the first entities, and
        denoting a highest ranking of the first entities as a positive sample, wherein the entity classifier weights features of the highest ranking of the first entities positively; and
    generating, by the one or more computing devices, an intent based on the classified relevant entity, and a property of the second properties of the second entities that corresponds to the classified relevant entity.

2. The method of claim 1, wherein ranking the first entities further comprises:
    ranking the first entities provided by the first connected service based on a quality of the relationships between each of the first entities.

3. The method of claim 2, wherein the quality of the relationships between each of the first entities is determined based on one or more of a type of the relationships, participation constraints, and the availability of an annotation in the second metadata.

4. The method of claim 1, further comprising:
    building, by the one or more computing devices, a skill on the classified relevant entity using the intent and the property.

5. The method of claim 1, wherein the process by which the entity classifier machine learning model is trained further comprises denoting a lowest ranking of the first entities as a negative sample, wherein the entity classifier weights features of the lowest ranking of the first entities negatively.

6. The method of claim 1, wherein generating the intent comprises annotating the intent with a type of action performed by the intent.

7. The method of claim 1, wherein generating the intent comprises annotating the intent with human-readable information regarding the property of the second properties of the second entities that corresponds to the classified relevant entity.

8. A system, comprising:
    a memory configured to store operations; and
    one or more processors configured to perform the operations, the operations comprising:
        reading second metadata from a second connected service, wherein the second metadata specifies second entities provided by the second connected service, properties of the second entities provided by the second services, and relationships between the second entities provided by the second service,
        classifying an entity of the second entities provided by the second service as a classified relevant entity using an entity classifier machine learning model trained by a process comprising:
            reading first metadata from a first connected service, wherein the first metadata specifies first entities provided by the first connected service and relationships between the first entities provided by the first connected service,
            ranking the first entities provided by the first connected service based on a quantity of the relationships between each of the first entities, and
            denoting a highest ranking of the first entities as a positive sample, wherein the entity classifier weights features of the highest ranking of the first entities positively, and
        generating an intent based on the classified relevant entity, and a property of the second properties of the second entities that corresponds to the classified relevant entity.

9. The system of claim 8, wherein ranking the first entities further comprises:
    ranking the first entities provided by the first connected service based on a quality of the relationships between each of the first entities.

10. The system of claim 9, wherein the quality of the relationships between each of the first entities is determined based on one or more of a type of the relationships, participation constraints, and the availability of an annotation in the second metadata.

11. The system of claim 8, the operations further comprising:
    building a skill on the classified relevant entity using the intent and the property.

12. The system of claim 8, wherein the process by which the entity classifier machine learning model is trained further comprises denoting a lowest ranking of the first entities as a negative sample, wherein the entity classifier weights features of the lowest ranking of the first entities negatively.

13. The system of claim 8, wherein generating the intent comprises annotating the intent with a type of action performed by the intent.

14. The system of claim 8, wherein generating the intent comprises annotating the intent with human-readable information regarding the property of the second properties of the second entities that corresponds to the classified relevant entity.

15. A computer readable storage device having instructions stored thereon execution of which, by one or more processing devices, causes the one or more processing devices to perform operations comprising:

reading second metadata from a second connected service, wherein the second metadata specifies second entities provided by the second connected service, properties of the second entities provided by the second services, and relationships between the second entities provided by the second service;

classifying an entity of the second entities provided by the second service as a classified relevant entity using an entity classifier machine learning model trained by a process comprising:

reading first metadata from a first connected service, wherein the first metadata specifies first entities provided by the first connected service and relationships between the first entities provided by the first connected service, ranking the first entities provided by the first connected service based on a quantity of the relationships between each of the first entities, and denoting a highest ranking of the first entities as a positive sample, wherein the entity classifier weights features of the highest ranking of the first entities positively;

and generating an intent based on the classified relevant entity, and a property of the second properties of the second entities that corresponds to the classified relevant entity.

16. The computer readable storage device of claim 15, wherein ranking the first entities further comprises:

ranking the first entities provided by the first connected service based on a quality of the relationships between each of the first entities.

17. The computer readable storage device of claim 16, wherein the quality of the relationships between each of the first entities is determined based on one or more of a type of the relationships, participation constraints, and the availability of an annotation in the second metadata.

18. The computer readable storage device of claim 15, the operations further comprising:

building a skill on the classified relevant entity using the intent and the property.

19. The computer readable storage device of claim 15, wherein the process by which the entity classifier machine learning model is trained further comprises denoting a lowest ranking of the first entities as a negative sample, wherein the entity classifier weights features of the lowest ranking of the first entities negatively.

20. The computer readable storage device of claim 15, wherein generating the intent comprises annotating the intent with a type of action performed by the intent.

* * * * *